T. Boyd.
Ventilator for Buildings.
N° 71964      Patented Dec. 10, 1867.
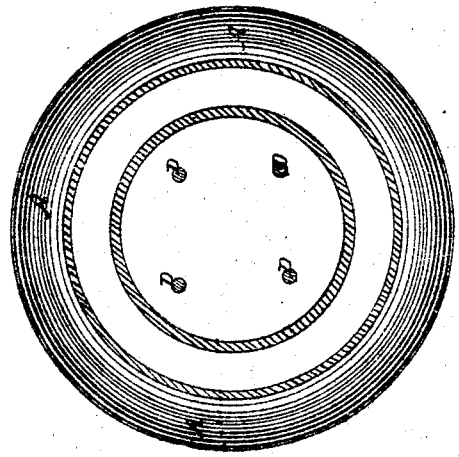
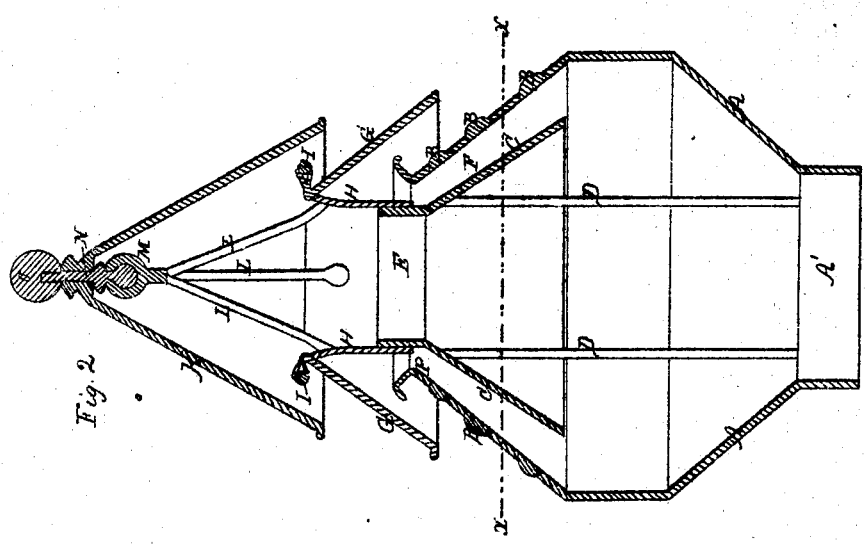
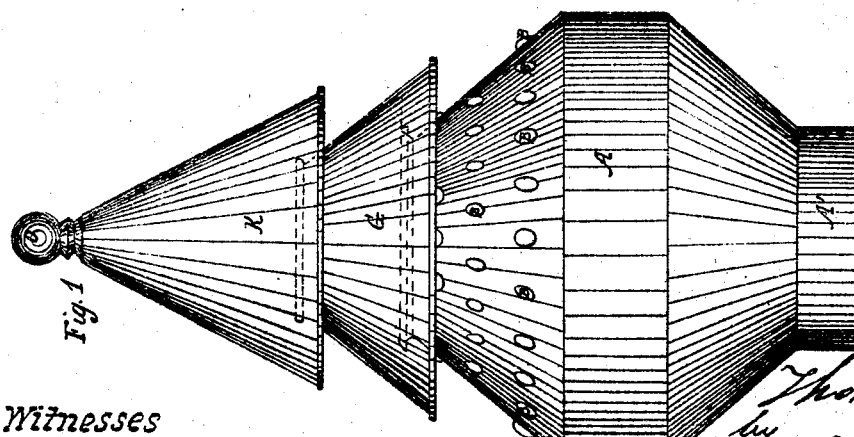
Witnesses
Inventor
Thomas Boyd

United States Patent Office.

THOMAS BOYD, OF CAMBRIDGEPORT, MASSACHUSETTS.

Letters Patent No. 71,964, dated December 10, 1867.

---

VENTILATOR FOR BUILDINGS.

---

The Schedule referred to in these Letters Patent and making part of the same.

---

TO ALL WHOM IT MAY CONCERN:

Be it known that I, THOMAS BOYD, of Cambridgeport, in the county of Middlesex, and State of Massachusetts, have invented a new and useful Improvement in Ventilators for Buildings, &c.; and I do hereby declare that the following is a full, clear, and exact description of the same, reference being had to the annexed drawings, making part of this specification, in which—

Figure 1 is an elevation.

Figure 2 is a vertical section.

Figure 3 is a horizontal section on the line $x$ $x$, fig. 2.

The same letters are used in all the figures in the indication of the same parts.

On the 20th day of August, A. D. 1861, and again on the 1st day of January, A. D. 1867, I obtained Letters Patent of the United States for improvements in ventilators for buildings, &c., to which I make reference as part of this specification for more full information touching the principles upon which the ventilator is designed to operate, and for the more perfect understanding of points not herein fully explained.

My present invention relates to improvements made upon my former inventions, as therein set forth, and are intended principally for the purpose of simplifying and cheapening their construction.

My improvements consist in omitting the parts which, while they may be useful, are not essential, nor, under ordinary circumstances, worth the increased cost of their introduction; also in the mode of suspending the upper cap upon a ball-and-socket joint, giving it free motion, rotary and oscillating, and in affixing elastic pads, upon which, in its action, it impinges, for the purpose of preventing unnecessary noise.

The following description will enable those who are skilled in the art to construct my improved ventilator.

A is a metallic chamber, of any convenient form, though I prefer the form set forth in the drawings. It is formed of sheet metal, and receives the air from the building or room to be ventilated through the pipe A'. This chamber I prefer to construct with lenses, B, so inserted that the heat of the sun passing through them, shall, by their action, be concentrated upon the external surface of the internal cone C, placed at the top of the chamber A. The cone becoming heated will produce an atmospheric circulation through the ventilator on still, hot days, when ordinary ventilators, which depend upon the action of the wind, though most needed, are wholly inoperative. This cone is supported by rods D, attached to the inside of the chamber A. E is the air-passage leading upwards through the cone C. Another air-passage, F, is formed between the cone and inner surface of the chamber A, through which the air is discharged under the cone G, supported upon the pipe H, which fits around the pipe E. This cone G is rigid, and extends below the mouth of the passage F, so as to exclude the rain. The upper edge of the cone G is flanged and curved outwardly, forming a groove to receive the elastic pad I, of India rubber or other suitable material, and extending around the upper edge of the cone G. The upper cone K is hung over the top of the cone G, and the air passing upwards through the pipes E and H, is discharged underneath it. It is supported upon rods L, attached to the inner surface of the pipe H by means of a ball-and-socket joint at M, the socket being supported upon the rods L, and the cone connected with it by means of the stem N, terminating below in a ball fitting within the socket. The stem N passes through the apex of the cone K, and is secured in place by the nut O. The ball-and-socket joint permits the cone K to rotate freely upon its axis, and also gives it an oscillating motion, so that the wind bearing against any side of it, it will swing against the elastic pad I, partially closing the opening between it and the lower cone on the side next the wind, and opening it to a corresponding degree on the side opposite. The ventilator is thus fitted to act either independently of the wind, by the action of the sun's rays on the chamber A and cone C, or by force of the wind, by means of the oscillating cap K, or by the effect of both conjointly. As a joint is formed at the connection of the pipes H and G, the upper part may be removed and used independently.

Having fully set forth the construction and operation of my improved ventilator, what I claim as my invention, and desire to secure by Letters Patent, is—

1. The combination of the chamber A with or without the lenses B, cone C, and rods D, constructed and arranged to operate substantially as and for the purpose set forth.

2. The combination of the oscillating cap K and elastic pads I, substantially as and for the purpose set forth.

3. The arrangement of the chamber A, cone C, pipes E and H, and cones G and K, substantially as set forth.

In testimony whereof, I have signed my name to this specification in the presence of two subscribing witnesses.

THOMAS BOYD.

Witnesses:
EDWARD RICHARDSON,
J. M. LIVERMORE.